Sept. 16, 1969  P. C. CONSOLETTI  3,467,811
POSITIONER AND EXTRACTOR DEVICE
Filed March 27, 1967
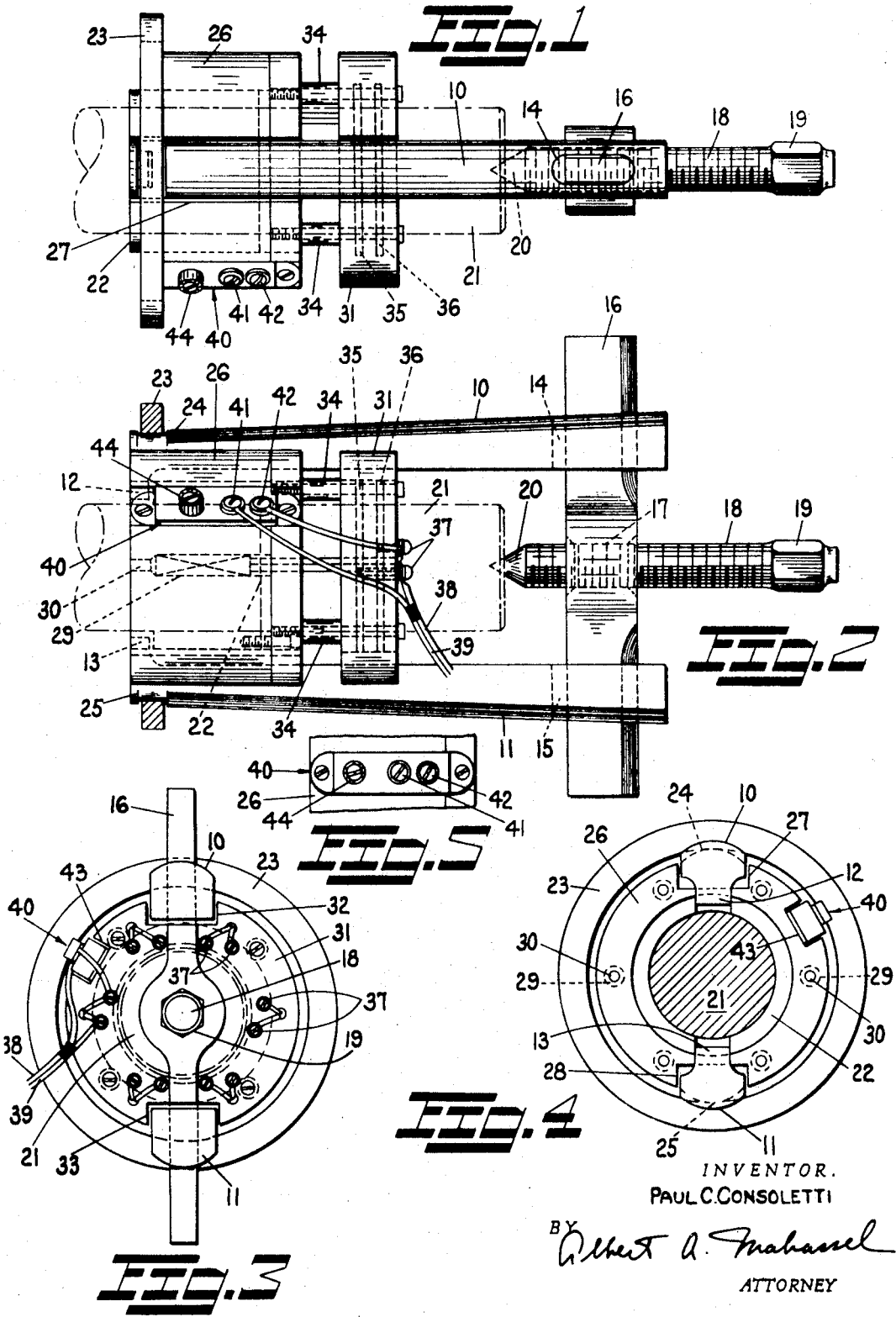
INVENTOR.
PAUL C. CONSOLETTI
BY
ATTORNEY United States Patent Office 3,467,811
Patented Sept. 16, 1969

3,467,811
POSITIONER AND EXTRACTOR DEVICE
Paul C. Consoletti, Milford, Mass., assignor, by mesne assignments, to John Donald Marshall and Horace L. Bomar, trustees of the Carolina Patent Development Trust
Filed Mar. 27, 1967, Ser. No. 626,237
Int. Cl. B23p 19/04; H05b 3/58
U.S. Cl. 219—227         1 Claim

ABSTRACT OF THE DISCLOSURE

A positioner and extractor device for assembling and removing metallic sleeves or the like from a shaft having selectively controllable heating means for expanding said sleeves to facilitate their movement upon said shaft.

BACKGROUND OF THE INVENTION

The invention relates to a device for assembling or removing cylindrical metallic members such as bearings, sleeves, races or the like from a shaft.

With many types of machinery which utilize these cylindrical metallic members, the latter are quite often designed to be fixedly positioned upon a shaft and one common known method of this form of assembly is that of a shrink fit.

A well-known means of obtaining a shrink fit is that of heating the members to be assembled in a hot oil bath to a predetermined temperature which is sufficient to expand them to a size which permits their positioning on a shaft with little or no resistance. As the heated members cool, they tend to shrink to their initial size and the inside diameter being less than the size of the shaft they are constricting maintained in their assembled position.

Replacement of the various types of cylindrical members has presented numerous and obvious complications, for in many instances the location and even the complexity of a machine does not lend itself to the expanding of said members by the oil bath method. With such conditions a commonly used method is that of expanding the cylindrical members by subjecting them to extreme heat from torches operating on such fuels as acetylene, propane or the like. This means has proven quite unsatisfactory in many instances for aside from being hazardous from a safety viewpoint, the excess heat to which these members are subjected oftentimes draws the temper from them resulting in rapid wear and premature failure thereof.

The positioner and extractor device for cylindrical members according to the instant invention has eliminated the undesirable conditions which present themselves with the known methods of assembly and replacement of said members.

The present device provides a portable and compact unit which in addition to possessing means for moving a cylindrical member lengthwise on a shaft, is provided with an electrically controlled heating element that is adapted to encompass said member. This heating element is provided with a selective control means for governing the amount of heat generated thereby that can be set at a predetermined temperature which is sufficient to expand the cylindrical member without drawing the temper therefrom.

SUMMARY OF THE INVENTION

The positioner and extractor device of the present invention includes a pair of opposed arms disposed in spaced relation having integrally formed hooked elements which are engageable with one end of a cylindrical member. These hooked elements are formed at one end of the arms and the opposite end of the latter are interconnected by a traverse member having a centrally disposed screw member assembled therein which is adapted to communicate with the end of a shaft.

The device further includes a generally circular sleeve which is adapted to encompass the cylindrical member to be assembled or extracted and includes a plurality of electrically controlled heating elements supported within the walls of the sleeve and at spaced points therearound. This circular sleeve is positioned intermediate the arms of the device and includes a pair of diametrically opposed channels through which said arms are adapted to extend.

The heating elements are connected in parallel with a selectively controllable thermostat which can be set so that said elements will only generate a predetermined amount of heat. By controlling the heat output, a sufficient amount can be generated to expand a cylindrical member without chancing the possibility of overheating said member and drawing the temper therefrom.

BRIEF DESCRIPTION OF THE DRAWING

FIG. 1 is a top view of the positioner and extractor device according to the invention showing its relation to a shaft and a sleeve member assembled thereon;

FIG. 2 is a view in side elevation of the device shown in FIG. 1;

FIG. 3 is a view looking in the direction of the end of the device provided with the screw member showing the opposed channels through which the arms of the device are adapted to extend;

FIG. 4 is a view looking at that end of the device opposite that shown in FIG. 3; and FIG. 5 is a top view of the selectively controllable thermostat for maintaining the circular sleeve that houses the heating elements at a predetermined temperature.

DESCRIPTION OF THE PREFERRED EMBODIMENT

Referring to FIGS. 1 and 2 the positioner and extractor device includes a pair of opposed arms 10 and 11 disposed in spaced relation which are provided with integrally formed hooked elements 12 and 13, respectively, on one end thereof.

Aligned slots 14 and 15 are provided adjacent those ends of arms 10 and 11 opposite the hooked elements 12 and 13 and a traverse member 16 is positioned within these slots with the ends thereof extending outwardly beyond said arms (FIG. 2). The traverse member 16 includes a centrally disposed threaded hole 17 which is adapted to receive a screw number 18. One end of this screw member is hexagonal shaped as at 19 and provides a means for turning said member with a hand tool. The opposite end of the screw member is tapered as at 20 (FIGS. 1 and 2) which is adapted to contact the end of a shaft that is identified by numeral 21.

A bushing 22 is shown assembled on shaft 21 with the integrally formed hooked elements 12 and 13 engaging that end of said sleeve most remote from the end of the shaft 21.

To prevent losing contact between the hooked elements and the end of the bushing as the screw member is turned, a retaining ring 23 encompasses the arms adjacent the hooked ends and portions of the inner surface of said ring are adapted to seat in grooves 24 and 25, respectively, provided in said arms 10 and 11 (FIGS. 1 and 4.

A generally circular sleeve 26 is disposed intermediate the arms 10 and 11 and is provided with diametrically opposed and longitudinally extending channels 27 and 28 through which said arms are adapted to extend (FIGS. 1 and 3). This circular sleeve 26 serves as a heater for expanding the bushing 22 and is provided with a plurality of cartridge heaters 29 (FIG. 2) which assemble in longitudinally extending apertures 30 provided in the walls of said sleeve and at spaced points therearound.

A terminal block 31 of generally circular configuration is also positioned intermediate the arms 10 and 11 in spaced relation to sleeve 26. This terminal block includes diametrically opposed grooves 32 and 33 (FIG. 3) which are in alignment with channels 27 and 28 provided in the sleeve 26. This terminal block is disposed in spaced relation to the sleeve 26 and is fixedly connected to the latter by means of stud elements 34. The terminal block 31 provides a means for connecting the plurality of cartridge heaters 29 in parallel by means of contact rings 35 and 36 (FIGS. 1 and 2) assembled and electrically insulated one from the other within the terminal block 31.

As shown in FIG. 3 there are six pairs of terminal connections on the face of the terminal block which are identified by numeral 37 and the member is equivalent to the number of cartridge heaters within the walls of the circular sleeve 26. Each of the terminal connections includes two screws for attaching the leads from their respective cartridge heater and as shown in FIG. 2 one of these screws touches contact ring 36 and the other contact ring 35. That screws which engage contact ring 35 passes through an aperture in ring 36 and is electrically insulated to prevent contact with the latter.

The source of electricity is drawn from any suitable supply through leads 38 and 39 (FIGS. 2 and 3) and is first directed through a selective temperature control unit which is in the form of a thermostat generally indicated by numeral 40. The thermostat is provided with a pair of terminal connections 41 and 42 and is assembled in a longitudinally extending groove 43 provided on the outer surface of the sleeve 26 (FIGS. 3 and 4).

The thermostat also includes an adjusting screw 44 which can be turned in one direction or the other to increase or decrease the temperature of the cartridge heaters to a predetermined and desired setting.

In operation, the unit is assembled over the end of a shaft as shown in FIGS. 1 and 2 with the sleeve 26 encompassing the bushing 22 and the hooked elements 12 and 13 engaging the end of said bushing. The screw member 18 is tightened by means of a wrench which is held with tension applied while sleeve 26 transmits its heat to the bushing 22. The shrink fit of the bushing is lost as the latter is caused to expand which immediately releases the tension on the screw member 18. At this point, one simply continues to turn the screw member inwardly and the bushing 22 is drawn outwardly over the end of the shaft.

The assembly of the bushing on the shaft is done in a similar manner. By simply reversing the device and placing the bushing within the sleeve and in engagement with the hooked elements it can be drawn to any desired position after being expanded.

While one embodiment of the invention has been disclosed, it is to be understood that the inventive concept may be carried out in a number of ways. This invention is, therefore, not to be limited to the precise details described, but is intended to embrace all variations and modifications thereof falling within the spirit of the invention and the scope of the claim.

I claim:
1. A positioner and extractor device adapted to move a hollow cylindrical metallic member onto and from a shaft, said device comprising
  (a) a pair of opposing arms disposed in spaced relation having integrally formed hooked elements engageable with one end of said metallic member,
  (b) a drawing means connected to said arms for moving said arms and said metallic member in a plane parallel to the axis of the shaft, and
  (c) expanding means disposed intermediate said arms for expanding said metallic member by controlled increased temperatures which includes
    (1) a generally circular sleeve adapted to encompass said metallic member in close contact therewith,
    (2) a plurality of electrically controlled heating elements spaced apart within the wall of said circular sleeve, said plurality of heating elements being connected in parallel with,
    (3) a thermostat for selective temperature control fixed to said circular sleeve, and
    (4) a terminal block secured in fixed separation from said circular sleeve, said terminal block being electrically connected between said thermostat and each one of said heating elements individually.

References Cited

UNITED STATES PATENTS

| | | | |
|---|---|---|---|
| 1,631,872 | 6/1927 | Knight | 29—258 |
| 2,179,819 | 11/1939 | Hoving | 219—535 X |
| 2,452,367 | 10/1948 | Gangloff | 219—535 X |
| 3,198,928 | 8/1965 | Allison | 219—7.5 |
| 3,240,912 | 3/1966 | Schoppman | 219—7.5 |

JOSEPH V. TRUHE, Primary Examiner

MARTIN C. FLIESLER, Assistant Examiner

U.S. Cl. X. R.

29—258; 219, 7.5, 535.